United States Patent
Yoshino

(10) Patent No.: US 10,474,603 B2
(45) Date of Patent: Nov. 12, 2019

(54) COMMUNICATION CONTROL UNIT FOR VEHICLE AND COMMUNICATION CONTROL SYSTEM FOR VEHICLE

(71) Applicant: SUBARU CORPORATION, Tokyo (JP)

(72) Inventor: Masakazu Yoshino, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/016,374

(22) Filed: Jun. 22, 2018

(65) Prior Publication Data
US 2019/0095371 A1    Mar. 28, 2019

(30) Foreign Application Priority Data

Sep. 28, 2017    (JP) .................... 2017-188486

(51) Int. Cl.
*G06F 13/38*    (2006.01)
*H04L 12/40*    (2006.01)
(Continued)

(52) U.S. Cl.
CPC .......... *G06F 13/38* (2013.01); *B60R 16/0238* (2013.01); *H04L 12/40* (2013.01);
(Continued)

(58) Field of Classification Search
None
See application file for complete search history.

(56) References Cited

U.S. PATENT DOCUMENTS 5,132,905 A * 7/1992 Takai .................... H04L 12/403
                                                            307/10.1
6,144,887 A * 11/2000 Kamiya ............. G05B 19/0426
                                                              700/2
(Continued)

FOREIGN PATENT DOCUMENTS

JP    2009-248804 A    10/2009
JP    2010-143404 A    7/2010
(Continued)

OTHER PUBLICATIONS

'Bosch Controller Area Network (CAN) Version 2.0' Motorola ltd., 1998. (Year: 1998).*

(Continued)

*Primary Examiner* — Steven G Snyder
(74) *Attorney, Agent, or Firm* — McDermott Will & Emery LLP

(57) ABSTRACT

A communication control unit for a vehicle is configured to be coupled to a first bus that couples control units to each other in the vehicle. The communication control unit includes a determination module and a communication control module. The determination module comprehensively determines whether to prohibit initialization of respective pieces of malfunction information stored in the control units, on the basis of a state of the vehicle. The communication control module transmits, to the first bus, an initialization control signal for controlling whether to prohibit the initialization of the malfunction information on the basis of a result of the determination made by the determination module.

18 Claims, 10 Drawing Sheets

(51) Int. Cl.
*B60R 16/023* (2006.01)
*G07C 5/08* (2006.01)

(52) U.S. Cl.
CPC .... *H04L 12/40019* (2013.01); *B60R 16/0231* (2013.01); *G07C 5/0808* (2013.01); *H04L 2012/40273* (2013.01)

(56) References Cited

U.S. PATENT DOCUMENTS

| | | | | |
|---|---|---|---|---|
| 6,801,942 | B1* | 10/2004 | Dietrich | H04L 12/4625 |
| | | | | 709/217 |
| 8,145,387 | B2* | 3/2012 | Tanaka | H04L 12/40039 |
| | | | | 280/735 |
| 8,495,407 | B2* | 7/2013 | Watanabe | H04J 3/0685 |
| | | | | 713/400 |
| 8,632,229 | B2* | 1/2014 | Yamazaki | B60Q 1/076 |
| | | | | 362/460 |
| 9,081,699 | B2* | 7/2015 | Tsuboi | G06F 8/60 |
| 10,187,406 | B2* | 1/2019 | Maeda | H04L 12/28 |
| 2007/0030844 | A1* | 2/2007 | Fukuta | G07B 15/063 |
| | | | | 370/359 |
| 2009/0254242 | A1 | 10/2009 | Kura | |
| 2010/0268980 | A1* | 10/2010 | Watanabe | H04J 3/0685 |
| | | | | 714/2 |
| 2011/0063860 | A1* | 3/2011 | Yamazaki | B60Q 1/076 |
| | | | | 362/466 |
| 2013/0096769 | A1 | 4/2013 | Kawamura et al. | |
| 2014/0294180 | A1* | 10/2014 | Link, II | G08G 1/205 |
| | | | | 380/270 |
| 2014/0351460 | A1* | 11/2014 | Tsuboi | G06F 8/60 |
| | | | | 710/36 |
| 2016/0294855 | A1* | 10/2016 | Maeda | H04L 12/28 |
| 2017/0118038 | A1* | 4/2017 | Ujiie | H04B 1/3822 |
| 2017/0178425 | A1 | 6/2017 | Ohno et al. | |
| 2018/0141439 | A1* | 5/2018 | Shin | B60L 3/0084 |
| 2018/0288000 | A1* | 10/2018 | Inoue | H04L 12/40013 |

FOREIGN PATENT DOCUMENTS

| | | |
|---|---|---|
| JP | 2010-266279 A | 11/2010 |
| JP | 2011-162079 A | 8/2011 |
| JP | 2013-086525 A | 5/2013 |
| JP | 5305239 B2 * | 10/2013 |
| JP | 2017-109609 A | 6/2017 |

OTHER PUBLICATIONS

Japanese Notification of Reasons for Refusal issued in corresponding Japanese Patent Application No. 2017-188486, dated Mar. 26, 2019, with English Translation.

* cited by examiner

COMMUNICATION CONTROL UNIT FOR VEHICLE AND COMMUNICATION CONTROL SYSTEM FOR VEHICLE

CROSS-REFERENCE TO RELATED APPLICATIONS

The present application claims priority from Japanese Patent Application No. 2017-188486 filed on Sep. 28, 2017, the entire contents of which are hereby incorporated by reference.

BACKGROUND

1. Technical Field

The present invention relates to a communication control unit for a vehicle and a communication control system for a vehicle.

2. Related Art

Conventionally, each of vehicles includes electronic control units (ECUs) that controls various structural elements. These electronic control units are coupled to each other via buses. The electronic control units communicate with each other in accordance with a standardized communication protocol or a uniquely-designed communication protocol.

Each of the electronic control units causes memory to store malfunction information when detecting that a structural element that is under the control of the electronic control unit is malfunctioning. In general, the malfunction information is kept in the memory until it is confirmed that the cause of the malfunction is resolved or it becomes possible to achieve driving with sufficient safety. Sometimes the malfunction information is transferred to another electronic control unit to cooperatively control electronic control units or to redundantly store the information in view of convenience of readout of the information.

A so-called scan tool (also referred to as a diagnostic unit) is an external unit capable of coupling to a bus via a connection interface installed in a vehicle. The scan tool is capable of reading out malfunction information held by the electronic control units. The read-out malfunction information is used for repairing a vehicle or analyzing a cause of the malfunction, for instance. The scan tool further has a function of requesting initialization of the malfunction information. For instance, when the repair of the vehicle is completed, a dealer sends an initialization request from the scan tool, and causes initialization (in other words, deletion) of pieces of the malfunction information stored in the respective electronic control units. However, in view of safety, sometimes it is not preferable to initialize malfunction information in a case where a vehicle is in a specific state. In addition, sometimes the electronic control units should handle malfunction information in an identical way in accordance with laws of respective countries.

Japanese Unexamined Patent Application Publication (JP-A) No. 2010-143404 and Japanese Unexamined Patent Application Publication (JP-A) No. 2010-266279 each propose a method for avoiding mixture of a unit that carries out initialization and a unit that does not carry out initialization in the case where an initialization request is transmitted to a plurality of electronic control units. More specifically, according to the method described in JP-A No. 2010-143404, malfunction information is initialized only in the case where a scan tool on an initialization request transmission side and respective electronic control units on an initialization request reception side make determinations with regard to conditions related to communication possibilities, ignition switch states, and the like and the predetermined conditions are satisfied. The method described in JP-A No. 2010-266279 especially focuses on the case where electronic control units hold identical malfunction information. According to the method described in JP-A No. 2010-266279, each of the electronic control units notifies the other units of its own state (availability of initialization), and determines whether to initialize the malfunction information on the basis of the states of all the units related to the respective electronic control unit.

SUMMARY OF THE INVENTION

An aspect of the present invention provides a communication control unit for a vehicle, the communication control unit being configured to be coupled to a first bus that couples control units to each other in the vehicle and including: a determination module configured to comprehensively determine whether to prohibit initialization of respective pieces of malfunction information stored in the control units, on the basis of a state of the vehicle; and a communication control module configured to transmit, to the first bus, an initialization control signal for controlling whether to prohibit the initialization of the malfunction information on the basis of a result of the determination made by the determination module.

An aspect of the present invention provides a communication control system for a vehicle, the communication control system including one or more control units and a communication control unit for the vehicle that are coupled to each other via a first bus. The communication control unit for the vehicle includes a determination module configured to comprehensively determine whether to prohibit initialization of respective pieces of malfunction information stored in the control units, on the basis of a state of the vehicle, and a communication control module configured to transmit, to the first bus, an initialization control signal for controlling whether to prohibit the initialization of the malfunction information on the basis of a result of the determination made by the determination module. Each of the one or more control units determines whether to initialize the malfunction information in response to an initialization request received from an external unit, depending on the initialization control signal received from the communication control unit for the vehicle via the first bus.

An aspect of the present invention provides a communication control unit for a vehicle, the communication control unit being configured to be coupled to a first bus that couples control units to each other in the vehicle and circuitry. The circuitry is configured to comprehensively determine whether to prohibit initialization of respective pieces of malfunction information stored in the control units, on the basis of a state of the vehicle, and transmit, to the first bus, an initialization control signal for controlling whether to prohibit the initialization of the malfunction information on the basis of a result of the determination made by the determination module.

DETAILED DESCRIPTION

Figure 1:
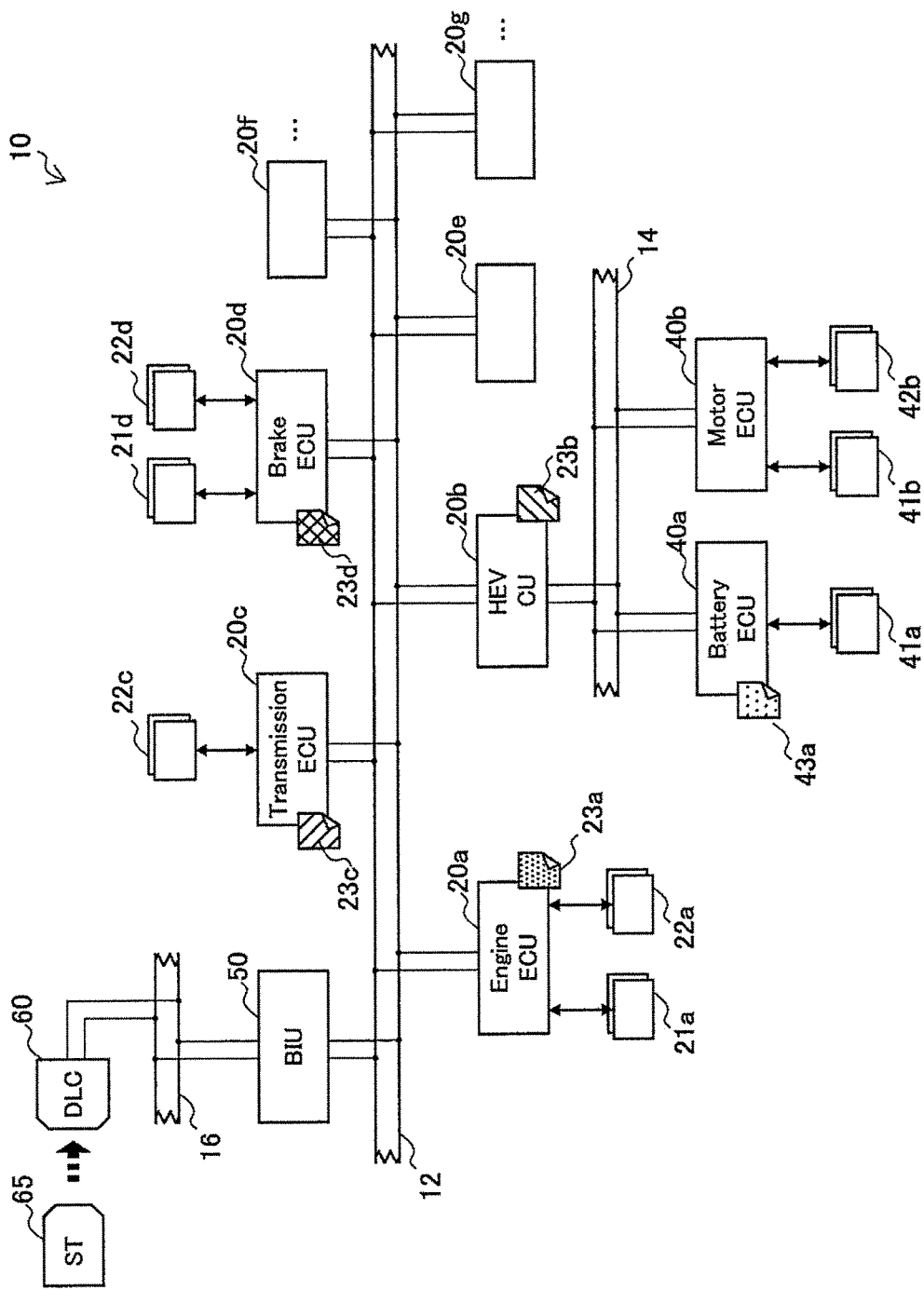
FIG. 1 is a block diagram illustrating an instance of a configuration of a vehicle network.

Hereinafter, preferred examples of the present invention will be described in detail with reference to the appended drawings. Note that the following description is directed to illustrative examples of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following examples which are not recited in a most-generic independent claim of the present invention are optional and may be provided on an as-needed basis. The drawings are schematic and are not intended to be drawn to scale. In this specification and the appended drawings, structural elements that have substantially the same function and structure are denoted with the same reference numerals, and repeated description of these structural elements is omitted.

However, the above-described existing methods of JP-A Nos. 2010-143404 and 2010-266279 achieves unified operations of the electronic control units regarding the initialization of malfunction information on the basis of relatively complex logics installed in the respective electronic control units (and diagnostic units). In this case, a complex logic should be installed every time a new electronic control unit is installed in a vehicle. In addition, the installation of new electronic control unit affects the logics of the units that have already been installed.

It is desirable to conduct resolution or at least relaxation of such disadvantages the existing methods have.

1. OVERVIEW

[1-1. System Configuration]

First, with reference to FIG. 1, an instance of a configuration of a communication control system for a vehicle will be described. As illustrated in FIG. 1, a communication control system 10 for a vehicle includes one or more buses and one or more control units that are coupled to each other via the buses. For instance, a main bus 12 couples control units 20a, 20b, 20c, 20d, 20e, 20f, 20g, . . . , and a body integration unit 50 to each other. A sub bus 14 couples the control unit 20b, control units 40a and 40b to each other. A diagnostic bus 16 couples the body integration unit 50 and a connection interface 60 to each other. Each of the main bus 12, the sub bus 14, and the diagnostic bus 16 may be implemented in accordance with the Controller Area Network (CAN), or may be implemented in accordance with another type of communication protocol such as the FlexRay, the Local Interconnect Network (LIN), or the Media Oriented Systems Transport (MOST), for instance. Note that, in the following description, the control units 20a, 20b, 20c, 20d, 20e, 20f, and 20g are referred to as control units 20 by omitting the alphabets attached to the end of the reference numeral, in the case where it is not necessary to particularly distinguish them. The same applies to reference signs of the other structural elements.

The control unit 20a is an engine ECU. The engine ECU 20a is coupled to one or more sensors 21a and one or more actuators 22a that are related to operation of an engine. For instance, the sensors 21a include an accelerator position sensor and an engine revolution speed sensor. The actuators 22a include a throttle valve and an injector of the engine. For instance, the engine ECU 20a controls operation of the engine in cooperation with the control unit 20b (to be described later) to obtain desired engine torque.

The control unit 20b is a hybrid electric vehicle control unit (HEVCU). The HEVCU 20b communicates with other control units and integrally controls operations of structural elements of the vehicle including the engine, motors, a transmission, a brake, and a battery. For instance, the HEVCU 20b calculates torque to be generated by the engine and motors on the basis of data such as an accelerator position, a vehicle speed, remaining battery charge, and the like, and transmits torque instructions to the control unit 20a and the control unit 40b, respectively. In addition, the HEVCU 20b determines a gear change timing, and transmits a gear change instruction to the control unit 20c. In addition, the HEVCU 20b determines a braking timing and a control variable, and transmits a braking instruction to the control unit 20d.

The control unit 20c is a transmission ECU. The transmission ECU 20c is coupled to one or more actuators 22c that are related to operation of the transmission. For instance, the actuators 22c include an oil pressure control mechanism that controls a gear ratio and engagement/disengagement of clutches. For instance, the transmission ECU 20c engages or disengages the clutches and shifts the gear ratio in response to the gear change instruction received from the control unit 20b.

The control unit 20d is a brake ECU. The brake ECU 20d is coupled to one or more sensors 21d and one or more actuators 22d that are related to operation of the brake. For instance, the sensors 21d include a vehicle speed sensor. The actuators 22d include an oil pressure control mechanism that controls brake pressures to respective wheels. For instance, the brake ECU 20d drives the oil pressure control mechanism and operates the brake in response to the braking instruction received from the control unit 20b.

The control unit 40a is a battery ECU. The battery ECU 40a is coupled to one or more sensors 41a related to management of states of the battery. For instance, the sensors 41*a* include a voltage sensor, a current sensor, and a temperature sensor. For instance, the battery ECU 40*a* transmits data indicating a state of the battery (such as remaining battery charge and temperature) acquired from the sensors 41*a*, to the control unit 20*b*.

The control unit 40*b* is a motor ECU. The motor ECU 40*b* is coupled to one or more sensors 41*b* and one or more actuators 42*b* that are related to operation of the motors. For instance, the sensors 41*b* include a motor rotation speed sensor. The actuators 42*b* include an inverter. For instance, the motor ECU 40*b* controls operation of the motors in cooperation with the control unit 20*b* to obtain desired motor torque or regenerative torque.

As illustrated in FIG. 1, the HEVCU 20*b* is coupled to the engine ECU 20*a*, the transmission ECU 20*c*, and the brake ECU 20*d* via the main bus 12. In addition, the HEVCU 20*b* is coupled to the battery ECU 40*a* and the motor ECU 40*b* via the sub bus 14. The control unit including the interfaces to the buses like the HEVCU 20*b* may have a gateway function of relaying a signal received from a certain bus to another bus.

The body integration unit (BIU) 50 functions as a communication hub for the whole vehicle, and integrates various networks including the main bus 12 serving as a control system network and other networks (not illustrated) such as an information system network and a safety system network in the vehicle, for instance. The body integration unit 50 is also coupled to the connection interface 60 via the diagnostic bus 16.

The connection interface 60 is an interface that helps an external unit to couple with the vehicle. For instance, the connection interface 60 may be a data link connector or a data link coupler (DLC) capable of coupling with a diagnostic unit typified by a general scan tool (GST). FIG. 1 illustrates a diagnostic unit 65 as an instance of the external unit.

[1-2. Description of Problem]

In general, vehicles include various control units as illustrated in FIG. 1. These control units communicate with each other via buses. In addition, each of the control units causes memory to store malfunction information when detecting malfunction of a structural element (such as a sensor, an actuator, or an internal module of an ECU) controlled by the control unit. The malfunction information may be standardized information such as Diagnostic Trouble Codes (DTCs) or may be uniquely-defined information, for instance. In general, the malfunction information is kept in the memory until it is confirmed that the cause of the malfunction is resolved or it becomes possible to achieve driving with sufficient safety. In the case where a malfunction that has been occurred is not fatal to traveling of a vehicle, a driver is capable of continuing traveling of the vehicle regardless of presence or absence of malfunction information. However, in the case where there is malfunction information that may affect traveling safety, some of the control units may perform control in fail-safe modes that are different from usual control modes. For instance, in the case where there is malfunction information associated with the accelerator position sensor, it is preferable for the engine ECU or HEVCU to set an accelerator position at a fail-safe value regardless of sensor input to prevent the vehicle from entering a runaway state.

In the case where the vehicle is malfunctioning, the driver or dealer is capable of coupling the scan tool (such as the diagnostic unit 65) to the vehicle and cause the scan tool to display malfunction information of the vehicle. In general, the scan tool also has a function of requesting initialization of malfunction information. For instance, when the repair of the vehicle or analysis of causes of the malfunction is completed, the dealer sends an initialization request from the scan tool to the network in the vehicle, and causes initialization (in other words, deletion) of pieces of the malfunction information stored in the respective control units. However, in the case where existence of malfunction information is used as a condition for activating the fail-safe function as described above, the malfunction information should be initialized only when a sufficient safety level is secured on the basis of the state of the vehicle. In addition, sometimes the control units should handle malfunction information in an identical way in accordance with laws of respective countries.

In the instance illustrated in FIG. 1, the engine ECU 20*a* stores malfunction information 23*a*. The HEVCU 20*b* stores malfunction information 23*b*. The transmission ECU 20*c* stores malfunction information 23*c*. The brake ECU 20*d* stores malfunction information 23*d*. The battery ECU 40*a* stores malfunction information 43*a*. In a certain scenario, the diagnostic unit 65 is coupled to the connection interface 60, the diagnostic unit 65 transmits an initialization request to the diagnostic bus 16, and then the body integration unit 50 relays the initialization request to the main bus 12. The HEVCU 20*b* further relays the initialization request going through the main bus 12 to the sub bus 14. If whether to initialize the malfunction information is up to individual control logics of the respective control units in response to the initialization request going through the bus as described above, a risk of deleting the malfunction information at an unexpected timing arises. In addition, this may violate the requirement of handling malfunction information in an identical way. To resolve the problems described above, JP-A No. 2010-266279 has proposed that each of the electronic control units notifies the other units of its own state (availability of initialization), and determines whether to initialize the malfunction information on the basis of the notified states of all the units related to the respective electronic control unit.

Figure 2:
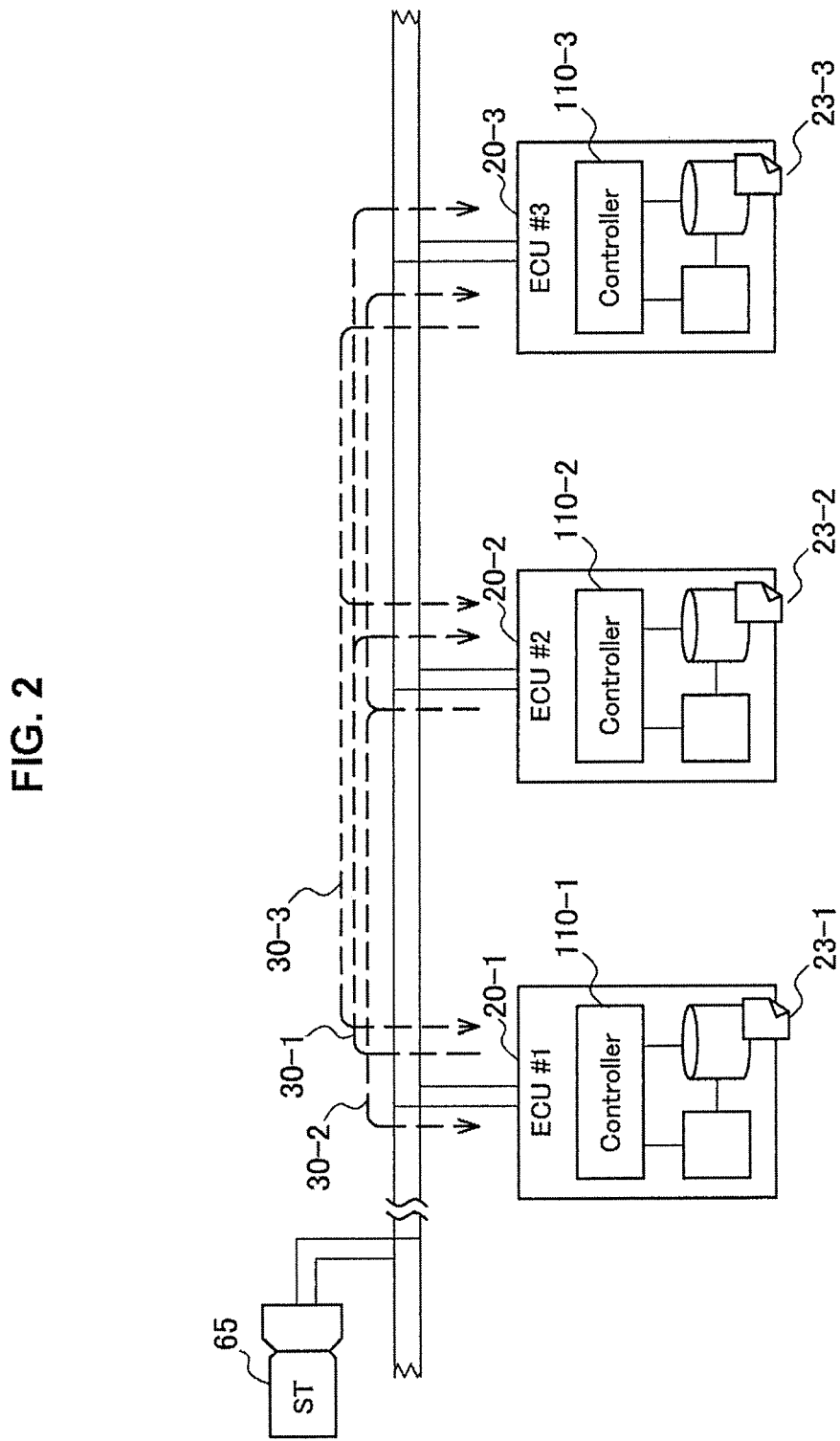
FIG. 2 is an explanatory diagram illustrating an instance of control of initialization of malfunction information in accordance with an existing method.

FIG. 2 is an explanatory diagram illustrating an instance of control of initialization of malfunction information in accordance with an existing method. In the instance illustrated in FIG. 2, each of a first ECU 20-1, a second ECU 20-2, and a third ECU 20-3 includes a controller that controls initialization of malfunction information. The controller 110-1 in the first ECU 20-1 routinely transmits, to a bus, a first control signal 30-1 indicating whether the first ECU 20-1 or a structural element that is under the control of the first ECU 20-1 is capable of initializing malfunction information 23-1 stored in the first ECU 20-1. The first control signal 30-1 is received by the second ECU 20-2 and the third ECU 20-3. The controller 110-2 in the second ECU 20-2 routinely transmits, to the bus, a second control signal 30-2 indicating whether the second ECU 20-2 or a structural element that is under the control of the second ECU 20-2 is capable of initializing malfunction information 23-2 stored in the second ECU 20-2. The second control signal 30-2 is received by the first ECU 20-1 and the third ECU 20-3. The controller 110-3 in the third ECU 20-3 routinely transmits, to the bus, a third control signal 30-3 indicating whether the third ECU 20-3 or a structural element that is under the control of the third ECU 20-3 is capable of initializing malfunction information 23-3 stored in the third ECU 20-3. The third control signal 30-3 is received by the first ECU 20-1 and the second ECU 20-2. The controller 110-1 initializes the malfunction information 23-1 in response to an initialization request received from the diagnostic unit 65, only in the case where the controller 110-1 is capable of initializing the malfunction information and it is determined from the second control signal 30-2 and the third control signal 30-3 that the controller 110-2 and the controller 110-3 are also capable of initializing their malfunction information. In a similar way, the controller 110-2 and the controller 110-3 also determine whether to initialize the malfunction information 23-2 and the malfunction information 23-3 respectively, on the basis of control signals received from all of the other related controller.

However, according to the above-described existing methods, control logics of the controllers 110-1, 110-2, and 110-3 should be changed when a new ECU is coupled to the bus. This is because each of the controllers has to determine whether to initialize its own malfunction information in view of malfunction information initialization availability of the new ECU. In other words, when using the existing methods, it is necessary to change logics that have already been installed in the existing ECUs every time a new ECU is introduced into the vehicle. In addition, it is necessary to install a relatively complex logic (that considers states of all of the other related controllers) in the new ECU to be introduced. This results in increase in cost for manufacturing vehicles, and reduction in reusability of the control units or their control logics. In addition, in the case where a large number of controllers routinely transmit control signals for controlling initialization to the bus, huge communication cost is necessary and storage of bus capacity may occur. In addition, the controllers may control initialization differently from each other in response to difference in arrival timings of control signals transmitted from the respective controllers.

[1-3. Basic Principle]

According to the example of the technology of the present disclosure, the function of comprehensively determining whether to prohibit initialization of malfunction information is implemented to achieve resolution or at least relaxation of the above-described disadvantages the existing methods have with regard to initialization of malfunction information of vehicles.

Figure 3:
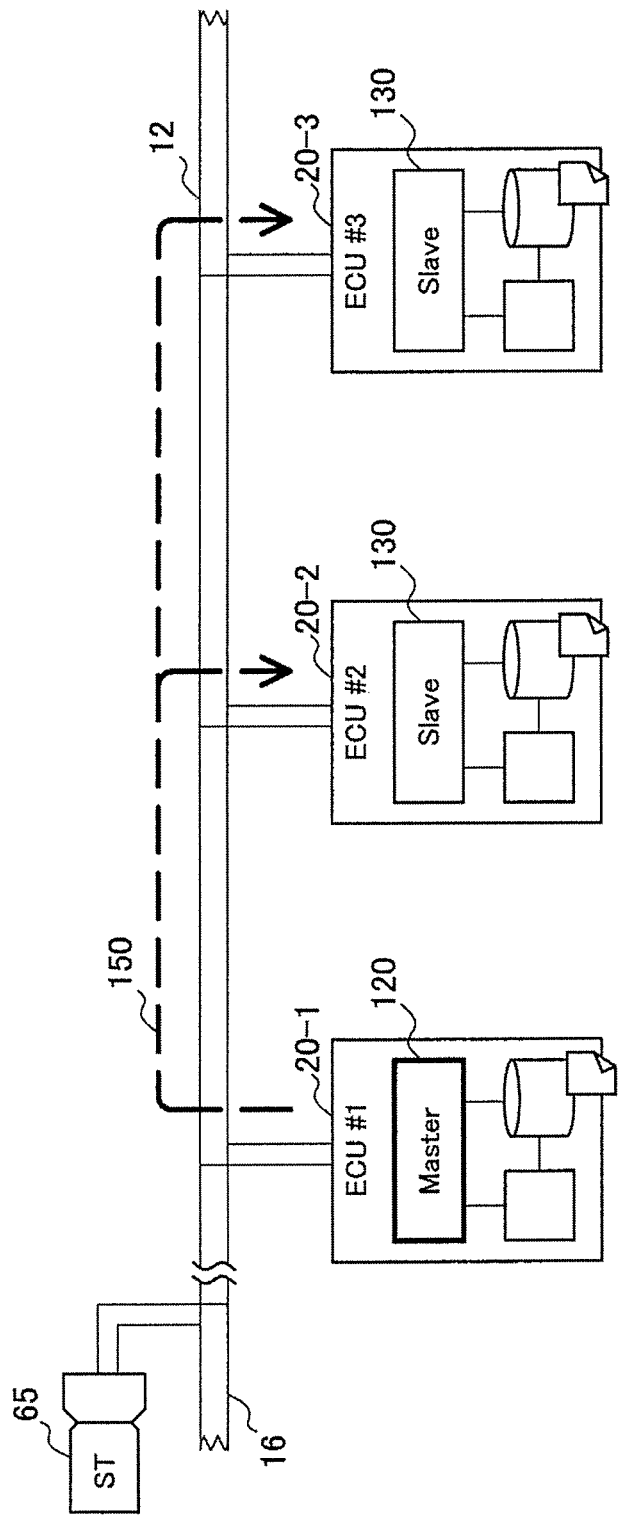
FIG. 3 is an explanatory diagram illustrating a basic principle of a technology according to the present disclosure.

FIG. 3 is an explanatory diagram illustrating a basic principle of the technology according to the present disclosure. In the instance illustrated in FIG. 3, the first ECU 20-1 has a master control function 120. Each of the second ECU 20-2 and the third ECU 20-3 has a slave control function 130. The master control function 120 comprehensively determines whether to prohibit initialization of respective pieces of malfunction information stored in the related ECUs (the first ECU 20-1, second ECU 20-2, and third ECU 20-3 in the instance illustrated in FIG. 3) on the basis of the state of the vehicle, and transmits an initialization control signal 150 to the main bus 12 on the basis of a result of the determination. On the other hand, the slave control functions 130 in the second ECU 20-2 and the third ECU 20-3 monitor the initialization control signal 150 going through the main bus 12. For instance, in the case where an initialization control signal (initialization prohibition signal) indicating prohibition of initialization of malfunction information is received, the slave control functions 130 do not initialize the malfunction information in response to the initialization request received from the external unit (such as the diagnostic unit 65) regardless of states of other units.

As described above, it is only necessary to change the control logic in the master control function 120 even when a new ECU is introduced into the vehicle in the case where the master control function 120 comprehensively determines whether to prohibit initialization of respective pieces of malfunction information in the related ECUs. It is only necessary for the slave control functions 130 in the ECUs that have already been installed to continue monitoring the initialization control signal 150 transmitted from the master control function 120 as ever. In addition, the newly-introduced ECU becomes capable of handling the malfunction information in the way identical to the ECUs that have already been installed, simply by implementing the same slave control function 130 as the ECUs that have already been installed.

The master control function 120 may be implemented in any one of the various control units 20 illustrated in FIG. 1. Typically, in view of communication cost, the master control function 120 is preferably implemented in a unit with a member for acquiring at least a piece of input information to be used for determining whether an initialization prohibition condition (to be described later) is satisfied. Note that, the master control function 120 may be implemented in a unit dedicated to comprehensive handing of pieces of malfunction information. Details of an example of such a system for comprehensively controlling initialization of malfunction information will be described in the subsequent paragraphs.

2. CONFIGURATION EXAMPLES OF RESPECTIVE FUNCTIONS

[2-1. Master Control Function]

Figure 4:
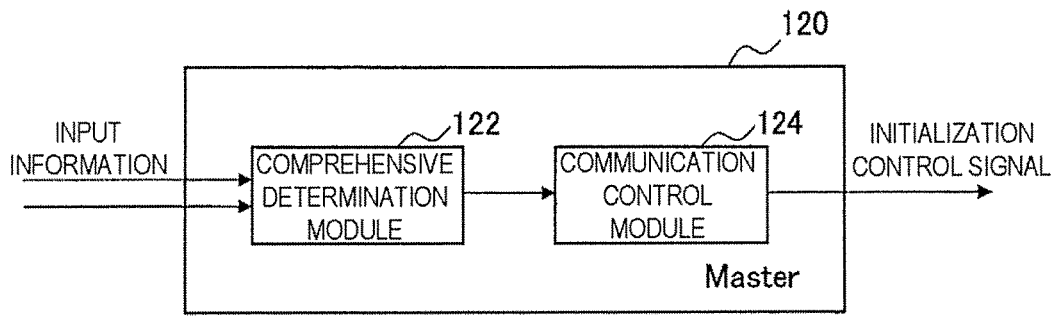
FIG. 4 is a block diagram illustrating an instance of a configuration of a master control function according to an example.

FIG. 4 is a block diagram illustrating an instance of a configuration of the master control function 120 according to the example. The master control function 120 is implemented in a unit coupled to the bus that couples at least control units to each other in the vehicle. In one example of the present invention, the unit having the master control function 120 may function as the communication control unit for the vehicle. As illustrated in FIG. 4, the master control function 120 includes a comprehensive determination module 122 and a communication control module 124.

(1) Comprehensive Determination Module

The comprehensive determination module 122 comprehensively determines whether to prohibit initialization of respective pieces of malfunction information stored in the control units, on the basis of a state of the vehicle. Here, the control units may include a unit having the master control function 120. For instance, in the case where the engine ECU 20a has the master control function 120, the comprehensive determination module 122 may comprehensively determine whether to prohibit initialization of pieces of malfunction information respectively stored in the engine ECU 20a and the HEVCU 20b (and other ECUs). In this specification, the expression "comprehensively determines" does not mean that the plurality of units individually or parallelly determine whether conditions that affect operation of the plurality of units are satisfied, but means that a specific unit comprehensively determines whether the conditions are satisfied.

Any condition can be used as a condition for comprehensively prohibit initialization of malfunction information (hereinafter, referred to as an initialization prohibition condition). Typically, the initialization prohibition condition relates to an operation state of the fail-safe function.

For instance, in the case where there is malfunction information associated with the accelerator position sensor, the engine ECU 20a controls the throttle on the basis of an accelerator position set at the fail-safe value regardless of sensor input. This can prevent the vehicle from entering a runaway state even when the sensor input shows an extremely high accelerator position due to malfunction. Such a fail-safe function should be maintained especially while the engine is not stopped. Accordingly, for instance, the initialization prohibition condition may be represented as follows:

a) the engine is in an ON state and the fail-safe function of the throttle is also in an ON state
   prohibit initialization of malfunction information;
b) the engine is in an OFF state and the fail-safe function of the throttle is also in an OFF state
   permit initialization of malfunction information.

In this case, the states of the vehicle include an operation state of the engine and an operation state of the fail-safe function of the throttle. In the case where the engine is in the ON state and the fail-safe function of the throttle is also in the ON state, the comprehensive determination module 122 determines to prohibit initialization of pieces of malfunction information stored in respective control units. The engine ECU 20a usually includes information for determining whether the above-described initialization prohibition condition is satisfied (the operation state of the engine and the operation state of the fail-safe function of the throttle). Therefore, in the case where the engine ECU 20a has the master control function 120, additional communication cost is not necessary for collecting the information required for determining whether the above-described initialization prohibition condition is satisfied.

As another instance, in the case where there is malfunction information associated with operation of the brake, the brake ECU 20d may turn on the fail-safe function so as not to release the brake without the driver's intention. Therefore, the initialization prohibition condition may include a condition related to the operation state of the fail-safe function of the brake in addition to (or instead of) the above-described condition related to the operation state of the fail-safe function of the throttle.

(2) Communication Control Module

On the basis of the result of the above-described comprehensive determination made by the comprehensive determination module 122, the communication control module 124 transmits the initialization control signal to the bus that couples the control units to each other. The initialization control signal is a signal for controlling whether to prohibit the initialization of malfunction information. The initialization control signal is received by the slave control functions 130 (to be described later).

For instance, the initialization control signal may include the initialization prohibition signal. For instance, in the case where the comprehensive determination module 122 determines to prohibit the initialization of the malfunction information, the communication control module 124 transmits, to the bus, the initialization prohibition signal for comprehensively prohibiting the initialization of the malfunction information. Regardless of states of other units, the initialization prohibition signal prohibits the control unit that has received the initialization prohibition signal from initializing the malfunction information in accordance with an initialization request that is received from an external unit. In the case where the initialization prohibition signal is received from the master control function 120, the slave control functions 130 do not recognize the states of the other units in the vehicle and do not initialize the malfunction information in response to the initialization request received from the external unit.

The initialization control signal may include an initialization permission signal. For instance, in the case where the comprehensive determination module 122 determines not to prohibit the initialization of the malfunction information, the communication control module 124 may transmit, to the bus, an initialization permission signal for permitting the initialization of the malfunction information. Regardless of states of other units, the initialization permission signal permits the control unit that has received the initialization permission signal to initialize the malfunction information in accordance with the initialization request that is received from the external unit. In the case where the initialization permission signal is received from the master control function 120, the slave control functions 130 initialize the malfunction information in response to the initialization request received from the external unit without recognizing the states of the other units in the vehicle.

Figure 5:
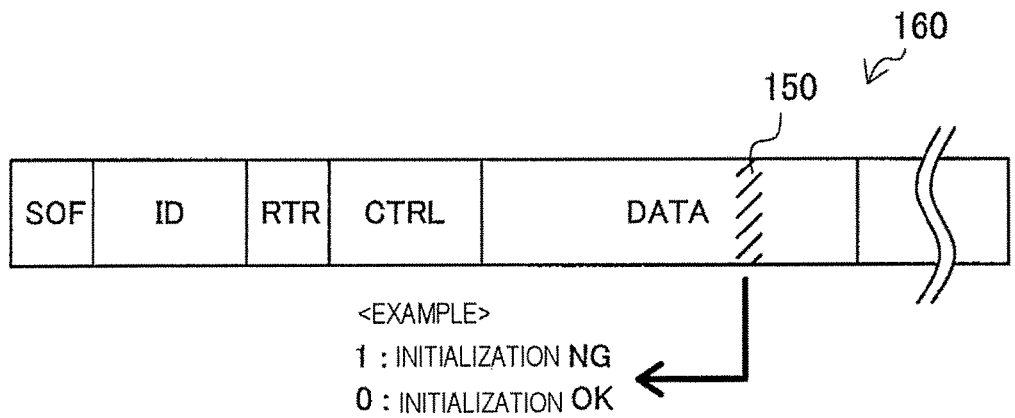
FIG. 5 is an explanatory diagram illustrating an instance of a configuration of an initialization control signal according to a practical example.

In a practical example, the initialization prohibition signal and the initialization permission signal may respectively correspond to a first bit value and a second bit value of a predetermined bit in a control frame that is periodically transmitted from the master control function 120. FIG. 5 is an explanatory diagram illustrating an instance of a configuration of an initialization control signal according to such a practical example. In the instance illustrated in FIG. 5, the initialization control signal 150 is included in a control frame 160 generated in accordance with a data frame construction of the CAN. More specifically, the control frame 160 includes a start-of-frame (SOF) field, an identifier (ID) field, a remote transmission request (RTR) field, a control (CTRL) field, a data (DATA) field, and the other subsequent fields (not illustrated).

The SOF field is used by a reception node for recognizing the start of the frame and for synchronizing a processing timing with the frame. The ID field is used for uniquely identifying a transmission node, and also used for arbitration (in other words, decision of transmission node to be prioritized) in the case where collision of frames occurs. Typically, an ID with a higher priority is assigned to the control frame 160 including the initialization control signal 150, in comparison with an initialization request frame transmitted from the diagnostic unit 65. The RTR field is used for distinguishing the data frame from a remote frame for requesting to return the data frame. The control field conveys control information indicating the length of the data field. The data field of the control frame 160 includes the initialization control signal 150 at a predefined bit position. In the initialization control signal 150 in the instance illustrated in FIG. 5, the bit value "1" means prohibition of initialization, and the bit value "0" means permission of the initialization. In this case, the bit indicating the bit value "1" may be interpreted as the initialization prohibition signal, and the bit indicating the bit value "0" may be interpreted as the initialization permission signal. Of course, the relation between the bit values and prohibition/permission of initialization may be reversed.

The initialization control signal is not limited to the instance illustrated in FIG. 5. The initialization control signal may include other elements. For instance, the initialization control signal may be a control message including a bit or code indicating whether the initialization is prohibited or permitted, and additional information. For instance, the additional information may include one or more of a time period in which initialization is prohibited or permitted, a code that specifies target piece of malfunction information, and an identifier for identifying a target ECU or a target ECU group.

[2-2. Slave Control Function]

Figure 6:
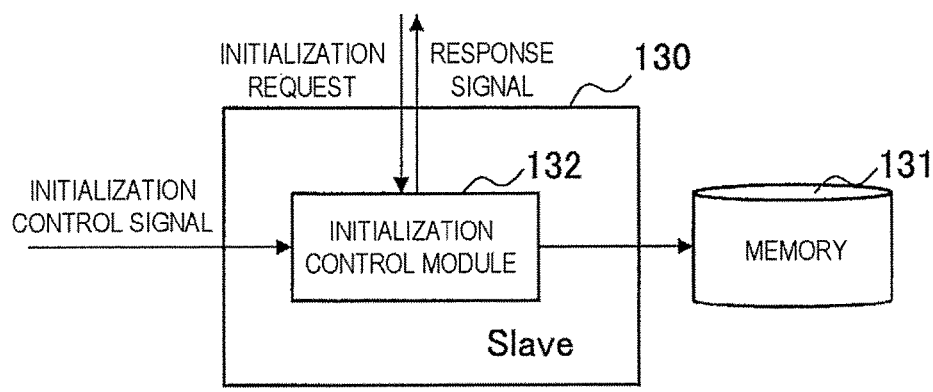
FIG. 6 is a block diagram illustrating an instance of a configuration of a slave control function according to an example.

FIG. 6 is a block diagram illustrating an instance of a configuration of the slave control function 130 according to an example. The slave control functions 130 are implemented in respective control units each of which includes memory 131 that stores a piece of malfunction information. As illustrated in FIG. 6, the slave control function 130 includes an initialization control module 132.

The initialization control module 132 determines whether to initialize malfunction information in response to an initialization request received from the external unit (such as the diagnostic unit 65), depending on an initialization control signal received from the master control function 120 via the bus. For instance, in the case where the initialization prohibition signal indicating prohibition of initialization of malfunction information is received, the initialization control module 132 does not initialize the malfunction information in response to the initialization request received from the external unit regardless of states of other units. In addition, in the case where the initialization permission signal indicating permission of initialization of malfunction information is received, the initialization control module 132 initializes the malfunction information in response to the initialization request received from the external unit regardless of states of other units. In the case where malfunction information is not initialized in response to the initialization request, the initialization control module 132 may return a response signal indicating refusal of the initialization (negative acknowledgement), to the external unit. In addition, in the case where malfunction information is initialized in response to the initialization request, the initialization control module 132 may return a response signal indicating completion of the initialization (acknowledgement), to the external unit.

More specifically, for instance, the initialization control module 132 monitors the control frame 160 periodically transmitted from the master control function 120 to the bus. For instance, the control frame 160 includes an ID assigned to a transmission source node of the control frame 160. In addition, the control frame 160 includes the initialization control signal 150 at a predefined bit position in the data field. With reference to the instance illustrated in FIG. 5, the initialization control signal 150 is the initialization prohibition signal in the case where the bit value at the bit position indicates "1", and the initialization control signal 150 is the initialization permission signal in the case where the bit value at the bit position indicates "0". As described above, the initialization control module 132 switches status (hereinafter, referred to as an initialization prohibition status) between prohibition and permission of the initialization of malfunction information, on the basis of the bit value of the initialization control signal 150. When receiving the initialization request from the external unit, the initialization control module 132 controls whether to initialize malfunction information stored in the memory 131 on the basis of the initialization prohibition status at this time.

[2-3. Gateway Function]

As described above, in general, a network in a vehicle includes a plurality of buses. In the case where the master control function 120 in a certain control unit sends the initialization control signal to a first bus among the plurality of buses, the initialization control signal does not go through buses other than the first bus, in general. However, the initialization control signal should also be relayed to the buses to which the master control function 120 is not coupled, because it is sometimes assumed that malfunction information is stored in a control unit that is only coupled to another bus.

For instance, in the instance illustrated in FIG. 1, the communication control system 10 for the vehicle includes the main bus 12, the sub bus 14, and the diagnostic bus 16. In the case where the engine ECU 20a includes the master control function 120 and the engine ECU 20a sends the control frame 160 to the main bus 12, the control frame 160 itself does not go through the sub bus 14. In this case, it is beneficial to implement the gateway function in the HEVCU 20b positioned between the main bus 12 and the sub bus 14. By using the gateway function, it is possible to relay the initialization control signal.

Figure 7:
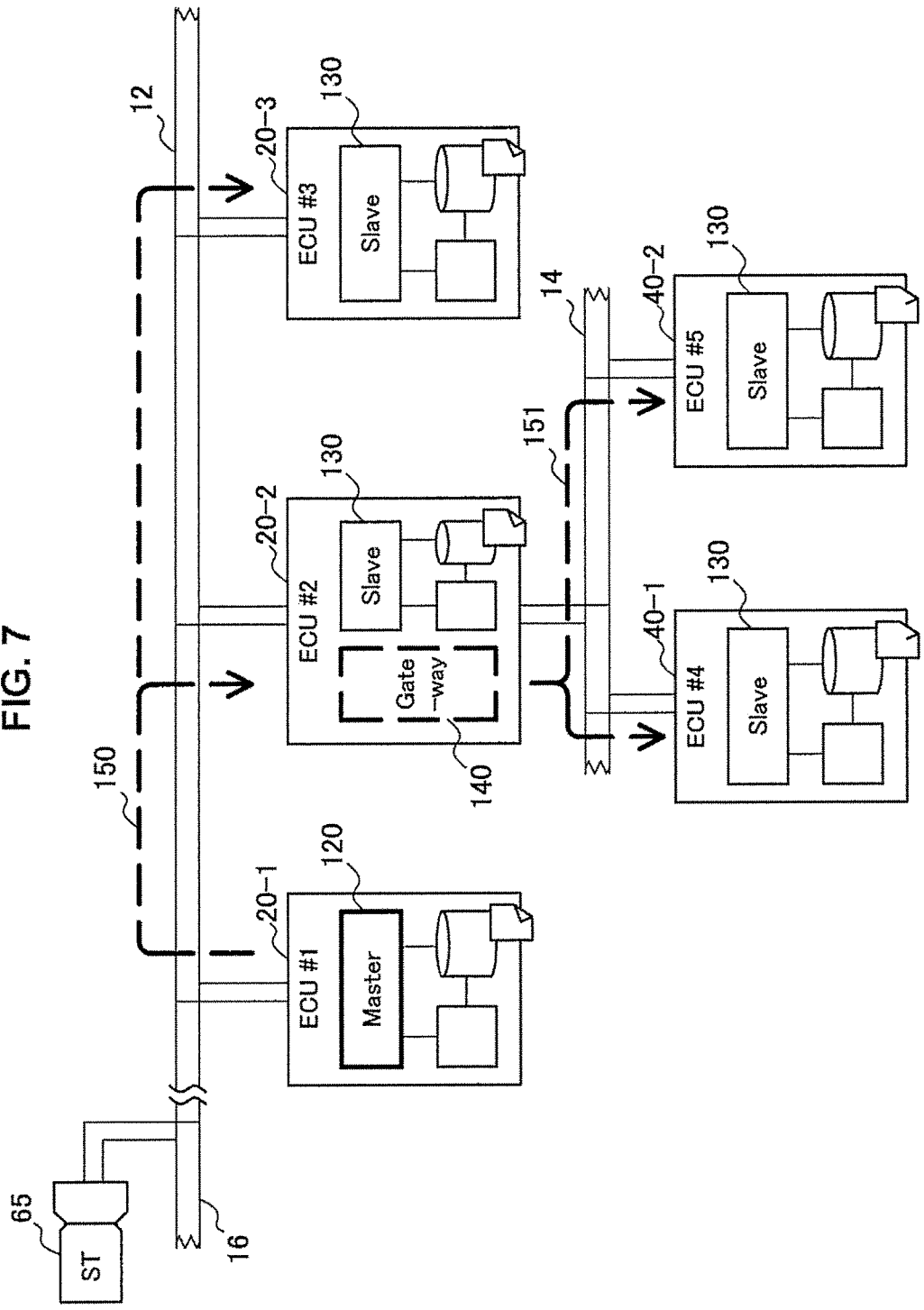
FIG. 7 is an explanatory diagram illustrating relay of an initialization control signal using a gateway function.

FIG. 7 is an explanatory diagram illustrating a gateway function according to an example. In the instance illustrated in FIG. 7, the first ECU 20-1 has the master control function 120. The second ECU 20-2 has the slave control function 130 and a gateway function 140. Each of the third ECU 20-3, a fourth ECU 40-1, and a fifth ECU 40-2 has the slave control function 130. As described above, the master control function 120 comprehensively determines whether to prohibit initialization of respective pieces of malfunction information stored in the related ECUs on the basis of the state of the vehicle, and transmits a control frame to the main bus 12. The control frame includes the initialization control signal 150 based the result of the determination. The slave control functions 130 in the second ECU 20-2 and the third ECU 20-3 monitor the control frame going through the main bus 12. In the case where the initialization prohibition signal is received, initialization of malfunction information does not conducted even if the initialization request is received from the external unit. In addition, in this example, the gateway function 140 of the second ECU 20-2 transmits a control frame to the sub bus 14. The control frame includes a secondary initialization control signal 151 corresponding to the initialization control signal 150 received from the master control function 120 via the main bus 12. For instance, the control frame transmitted from the gateway function 140 may have a structure similar to the control frame 160 illustrated in FIG. 5. Note that, in the ID field, an ID that is different from the control frame 160 may be set. The slave control functions 130 in the fourth ECU 40-1 and the fifth ECU 40-2 monitor the control frame going through the sub bus 14. In addition, such slave control functions 130 do not initialize malfunction information even when receiving the initialization request from the external unit in the case where the initialization prohibition signal is received. In the case where the initialization permission signal is received, such slave control functions 130 initialize the malfunction information in response to reception of the initialization request.

Figure 8:
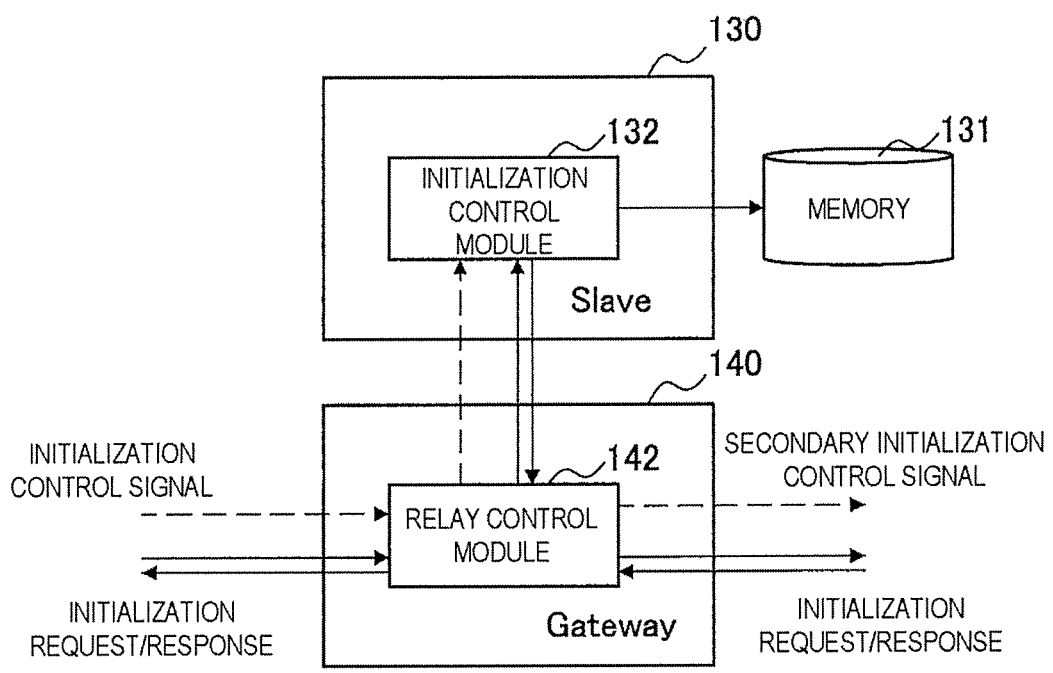
FIG. 8 is a block diagram illustrating an instance of a configuration of a gateway function according to an example.

FIG. 8 is a block diagram illustrating an instance of a configuration of the gateway function 140 according to an example. Note that, here, FIG. 8 illustrates the instance in which one communication control unit for a vehicle has the slave control function 130 in addition to the gateway function 140. However, the present disclosure is not limited thereto. It is also possible for the communication control unit for the vehicle to have the gateway function 140 alone. The configuration of the slave control function 130 may be similar to the configuration described with reference to FIG. 6. Accordingly, repeated description will be omitted. As illustrated in FIG. 8, the gateway function 140 includes a relay control module 142.

The relay control module 142 transmits a secondary initialization control signal to a second bus (such as the sub bus 14) that is different from the first bus (such as the main bus 12). The secondary initialization control signal corresponds to the initialization control signal received from the master control function 120 via the first bus. The relay control module 142 also outputs the initialization control signal to the initialization control module 132 of the slave control function 130 in the same unit. In addition, in the case of receiving the initialization request from the external unit via the first bus, the relay control module 142 relays the initialization request to the second bus. The relay control module 142 also outputs the initialization request to the initialization control module 132 of the slave control function 130 in the same unit. Subsequently, the relay control module 142 relays a response signal to the first bus in the case of receiving the response signal from the slave control function 130 coupled to the second bus, in response to the initialization request.

In the configuration illustrated in FIG. 8, the connection interface that is coupled to the external unit and that is capable of sending the initialization request is preferably installed not on the second bus side but on the first bus side with reference to the gateway function 140. In this case, the initialization request transmitted from the external unit arrives at the second bus via the first bus. Next, even if the initialization request is transmitted simultaneously with the initialization prohibition signal, it is possible to prioritize all the slave control functions 130 with regard to reception of the initialization prohibition signal regardless of which bus is coupled to the slave control functions 130, by performing priority control such as arbitration of collision frames based on frame IDs of the CAN, for instance.

3. INSTANCE OF WORKFLOW OF PROCESS

[3-1. Master Control]

Figure 9:
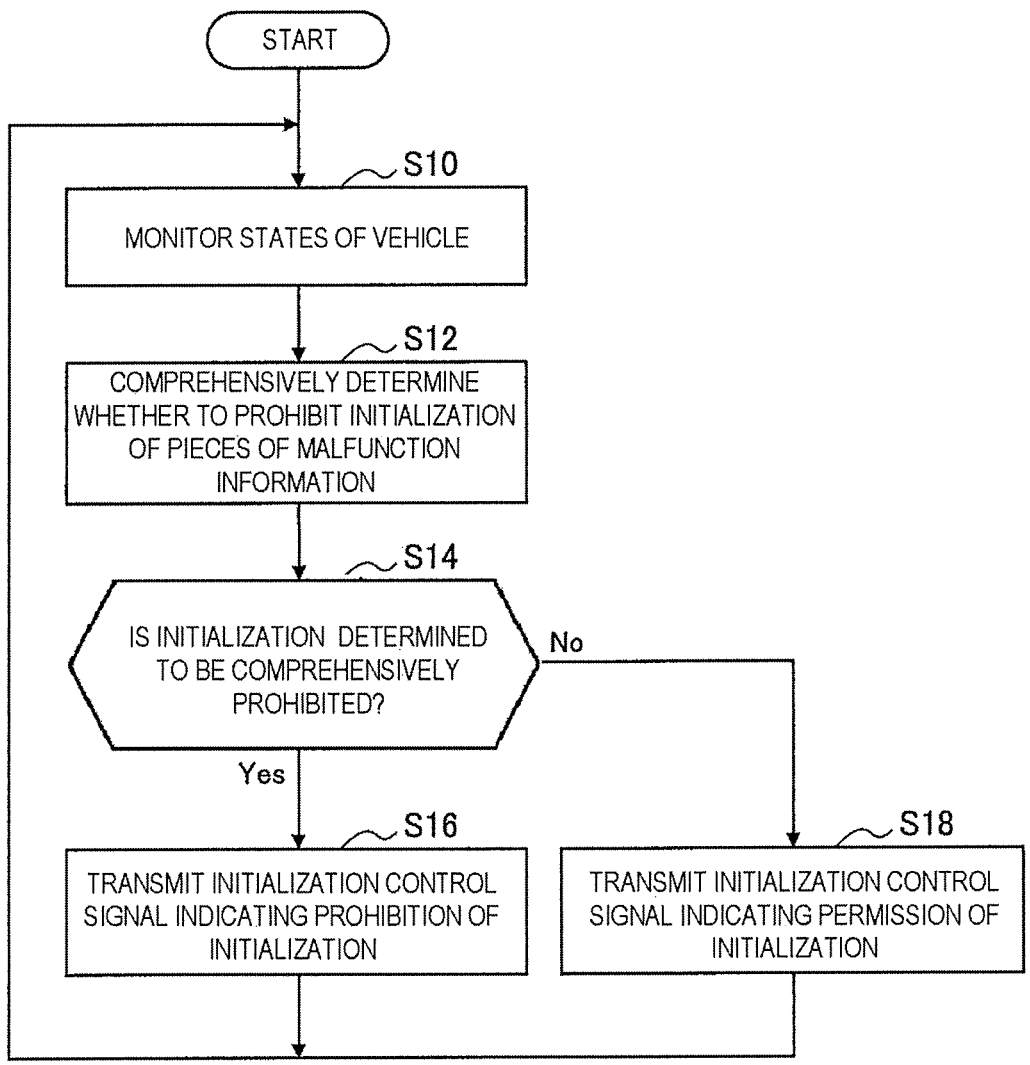
FIG. 9 is a flowchart illustrating an instance of workflow of a process conducted by a master control function according to an example.

FIG. 9 is a flowchart illustrating an instance of workflow of a process conducted by the master control function 120 according to the above-described example.

With reference to FIG. 9, the comprehensive determination module 122 in the master control function 120 first monitors states of a vehicle (Step S10). For instance, in the case of protecting the fail-safe function of the throttle, the states of the vehicle may include the operation state of the engine and the operation state of the fail-safe function of the throttle. In this case, the comprehensive determination module 122 routinely monitors whether the engine is in the ON state or the OFF state and whether the fail-safe function of the throttle is in the ON state or the OFF state.

Next, the comprehensive determination module 122 comprehensively determines whether to prohibit initialization of respective pieces of malfunction information stored in the control units, on the basis of the monitored states of the vehicle (Step S12). For instance, if the engine is in the ON state and the fail-safe function of the throttle is also in the ON state, the comprehensive determination module 122 determines to prohibit the initialization of the malfunction information.

If not, the comprehensive determination module 122 determines to permit the initialization of the malfunction information.

The subsequent process diverges depending on whether the initialization of the malfunction information is determined to be comprehensively prohibited or determined to be permitted (Step S14). In the case where the comprehensive determination module 122 determines to prohibit the initialization of the malfunction information, the communication control module 124 transmits, to the bus, the initialization prohibition signal indicating comprehensive prohibition of the initialization of the malfunction information (Step S16). Alternatively, in the case where the comprehensive determination module 122 determines to permit the initialization of the malfunction information, the communication control module 124 transmits, to the bus, the initialization permission signal indicating permission of the initialization of the malfunction information (Step S18).

The process returns to Step S10 after the initialization control signal is transmitted. The initialization control signal may be the initialization prohibition signal or the initialization permission signal. Typically, the master control function 120 repeats the process in Step S10 to Step S18 periodically while the communication control system 10 for the vehicle is in operation (in other words, a time period in which there is a possibility that the initialization request goes through the network).

[3-2. Slave Control]

Figure 10:
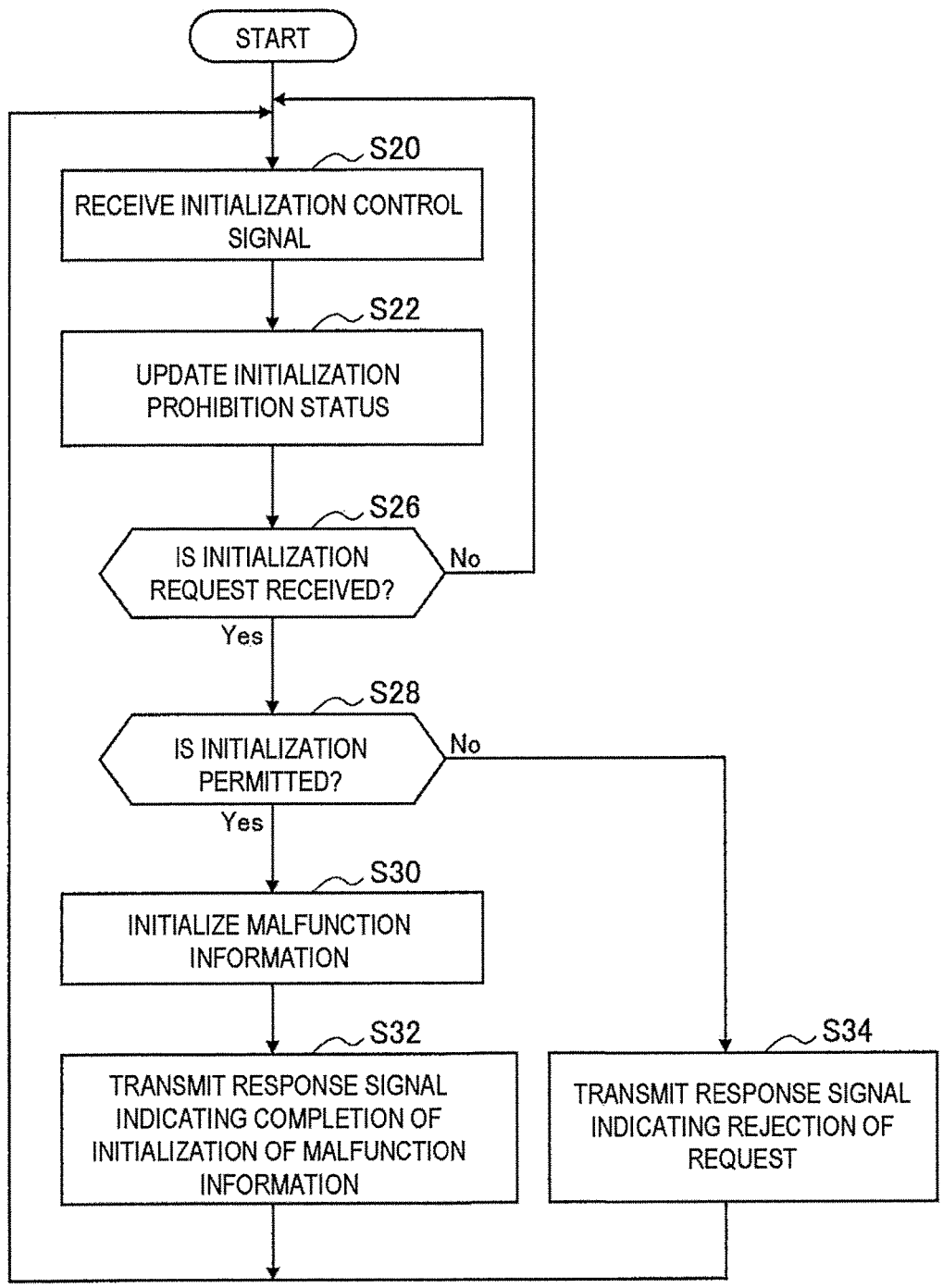
FIG. 10 is a flowchart illustrating an instance of workflow of a process conducted by a slave control function according to an example.

FIG. 10 is a flowchart illustrating an instance of workflow of a process conducted by the slave control function 130 according to the above-described example.

With reference to FIG. 10, the initialization control module 132 in the slave control function 130 first receives the initialization control signal transmitted from the master control function 120 via the bus (Step S20). For instance, in the case where the initialization control signal is a predetermined bit in the control frame 160 transmitted from the master control function 120, the initialization control module 132 first detects the control frame 160 including a predetermined ID from among various frames going through the bus. Next, the initialization control module 132 extracts, as the initialization control signal, a bit at a predefined bit position included in the detected control frame 160.

Next, the initialization control module 132 updates an initialization prohibition status in accordance with the received initialization control signal (Step S22). For instance, in the case where the bit extracted as the initialization control signal includes a value indicating prohibition of initialization, the initialization control module 132 sets the initialization prohibition status to "prohibition". Alternatively, in the case where the bit extracted as the initialization control signal includes a value indicating permission of initialization, the initialization control module 132 sets the initialization prohibition status to "permission".

In addition, the initialization control module 132 determines whether the initialization request is received from the external unit (Step S26). In the case where the initialization request is not received, the process returns to Step S20, and the initialization control module 132 receives the initialization control signal again in the next cycle. In the case where the initialization request is received, the process proceeds to Step S28.

The process after Step S28 diverges depending on the initialization prohibition status at this time. In the case where the initialization of the malfunction information is permitted, the initialization control module 132 initializes the malfunction information stored in the memory 131 (Step S30). Next, in response to the initialization request, the initialization control module 132 transmits a response signal indicating completion of the initialization of the malfunction information (Step S32). On the other hand, in the case where the initialization of malfunction information is prohibited, the initialization control module 132 does not initialize the malfunction information, and transmits a response signal indicating rejection of the initialization request (Step S34).

Next, the process returns to Step S20. Typically, the slave control function 130 repeats the process in Step S20 to Step S34 periodically while the communication control system 10 for the vehicle is in operation.

[3-3. Gateway]

Figure 11:
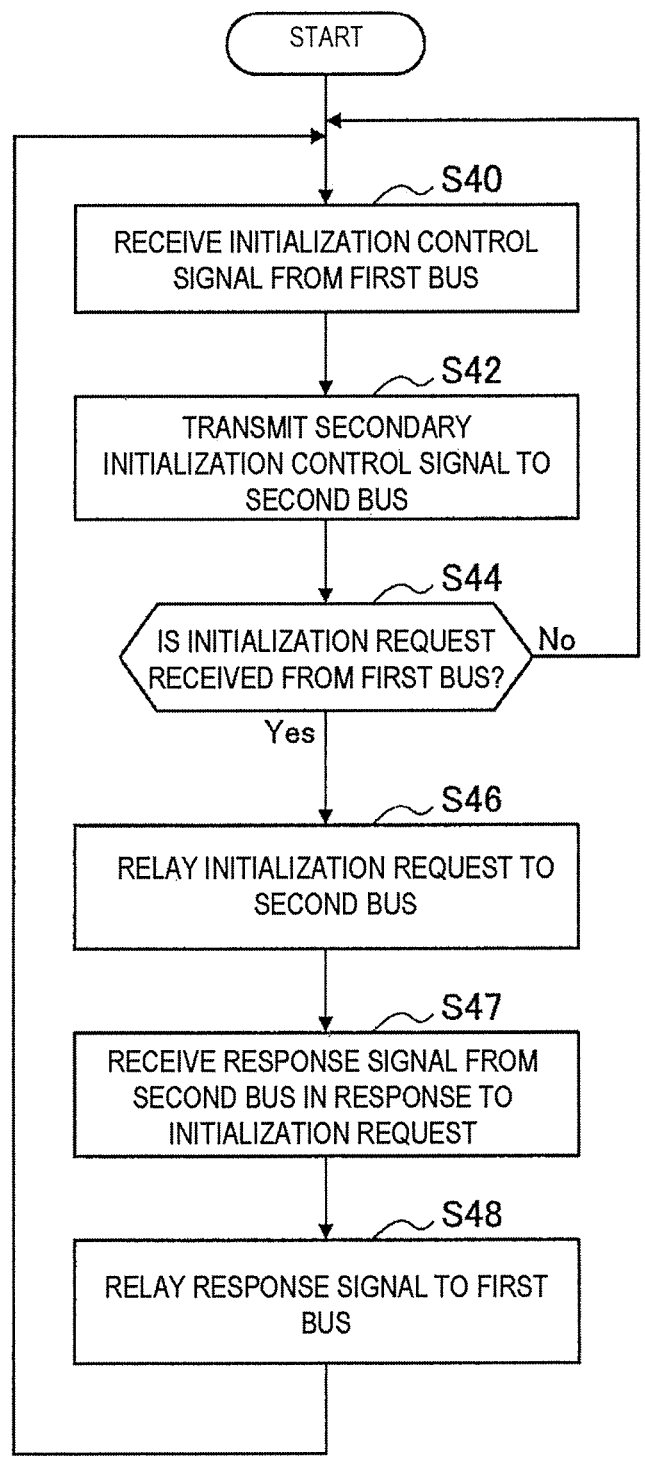
FIG. 11 is a flowchart illustrating an instance of workflow of a process conducted by a gateway function according to an example.

FIG. 11 is a flowchart illustrating an instance of workflow of a process conducted by the gateway function 140 according to the above-described example.

With reference to FIG. 11, the relay control module 142 in the gateway function 140 first receives the initialization control signal transmitted from the master control function 120 via the first bus (Step S40). Next, the relay control module 142 transmits a secondary initialization control signal corresponding to the received initialization control signal, to the second bus (Step S42). For instance, the relay control module 142 may generate a secondary control frame including a bit of the initialization control signal extracted from the received control frame, and transmit the generated secondary control frame to the second bus. Alternatively, the relay control module 142 may generate a secondary control frame by copying a data field of the received control frame without recognizing which of the bits is the initialization control signal, and transmit the generated secondary control frame to the second bus.

In addition, the relay control module 142 determines whether the initialization request is received from the first bus (Step S44). In the case where the initialization request is not received, the process returns to Step S40. In the case where the initialization request is received, the process proceeds to Step S46.

In Step S46, the relay control module 142 relays the initialization request received from the first bus to the second bus. Subsequently, when receiving a response signal from the second bus in response to the initialization request (Step S47), the relay control module 142 relays the response signal to the first bus (Step S48). Note that, in the case where a plurality of control units are coupled to the second bus, the plurality of control units may return respective response signals in response to relay of a single initialization request.

4. MODIFICATION

The instance in which the communication control system 10 for the vehicle includes only one master control function 120 has been mainly described above. However, the technology according to the present disclosure may be applied to a case where the system includes a plurality of the master control functions 120. For instance, the engine ECU 20a has the master control function 120 for protecting the fail-safe function of the throttle, and another ECU may have the master control function 120 for protecting another fail-safe function (or the master control function 120 having purposes other than the protection of the fail-safe function). The slave control function 130 monitors initialization control signals received from the respective master control functions 120. In the case where at least one of the initialization control signals indicates prohibition of initialization of malfunction information, the slave control function 130 may set the initialization prohibition status to "prohibition".

Figure 12:
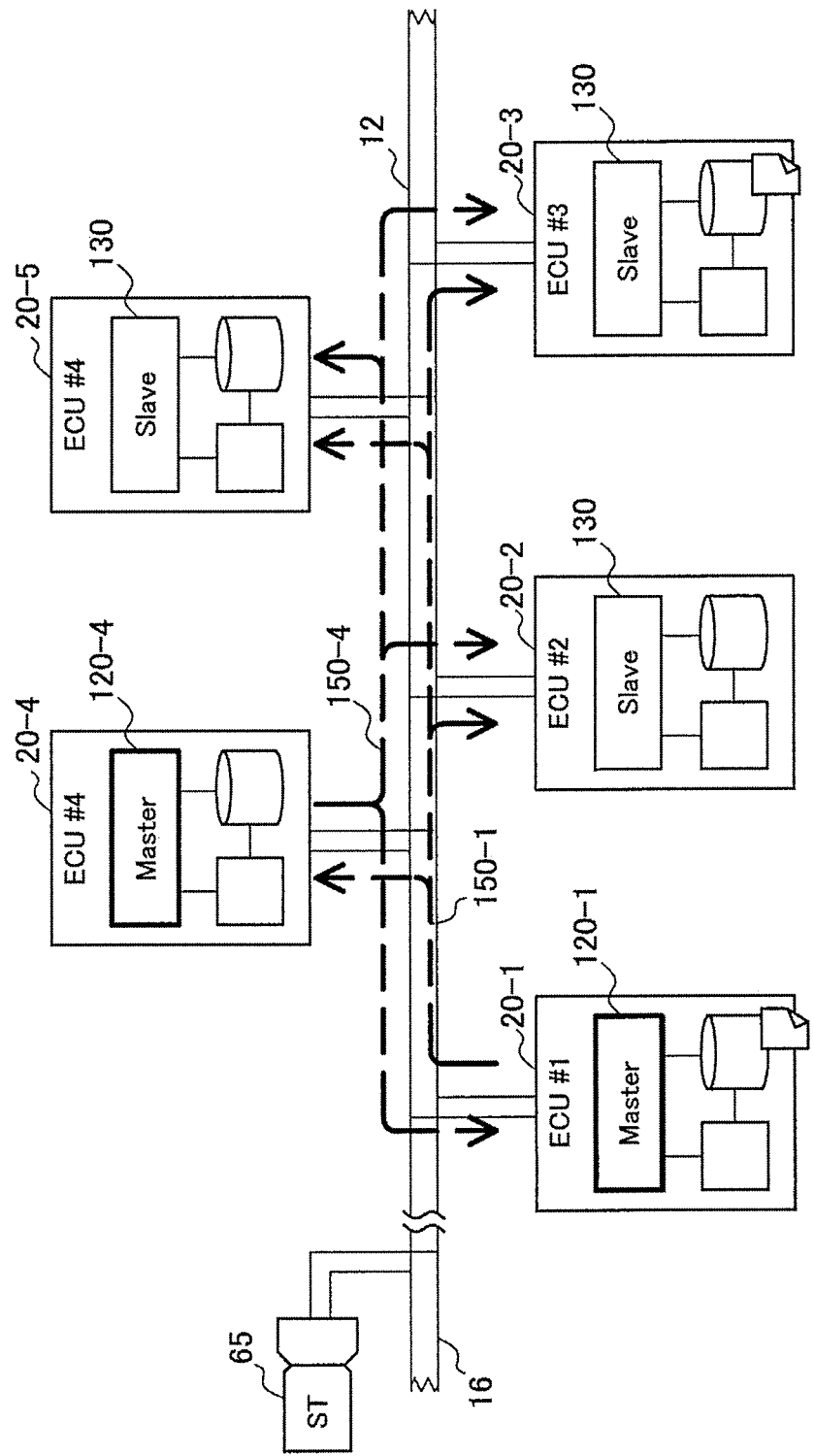
FIG. 12 is an explanatory diagram illustrating an instance of a configuration including a plurality of master control functions.

FIG. 12 is an explanatory diagram illustrating an instance of a configuration including a plurality of master control functions 120. In the instance illustrated in FIG. 12, five ECUs 20 are coupled to the main bus 12. The first ECU 20-1 has a first master control function 120-1. Each of the second ECU 20-2 and the third ECU 20-3 has the slave control function 130. The fourth ECU 20-4 has a second master control function 120-4. The fifth ECU 20-5 has the slave control function 130.

The first master control function 120-1 in the first ECU 20-1 comprehensively determines whether to prohibit initialization of respective pieces of malfunction information stored in the ECUs, in accordance with a first initialization prohibition condition. Next, the first master control function 120-1 transmits, to the main bus 12, an initialization control signal 150-1 for controlling whether to prohibit the initialization of the malfunction information on the basis of a result of the determination.

The second master control function 120-4 in the fourth ECU 20-4 comprehensively determines whether to prohibit initialization of the respective pieces of malfunction information stored in the ECUs, in accordance with a second initialization prohibition condition that is different from the first initialization prohibition condition. Next, the second master control function 120-4 transmits, to the main bus 12, an initialization control signal 150-4 for controlling whether to prohibit the initialization of the malfunction information on the basis of a result of the determination.

The slave control functions 130 in the second ECU 20-3, the third ECU 20-3, and the fifth ECU 20-5 receive the initialization control signal 150-1 and the initialization control signal 150-4. Next, in the case where one or both of the signals indicate prohibition of initialization of malfunction information, the slave control functions 130 do not initialize the malfunction information in response to the initialization request received from the external unit regardless of states of other units. In addition, the first ECU 20-1 and the fourth ECU 20-4 may also determine whether to initialize their own malfunction information in view of the initialization control signal 150-4 or 150-1 received from another ECU in the case where their own malfunction information is stored in the first ECU 20-1 and the fourth ECU 20-4.

5. CONCLUSION

With reference to FIGS. 1 to 12, details of various examples of the technology according to the present disclosure have been described above. According to the above-described examples, in the communication control unit for the vehicle coupled to the first bus that couples the control units to each other in a vehicle, it is comprehensively determined whether to prohibit initialization of respective pieces of malfunction information stored in the control units on the basis of the states of the vehicle, and the initialization control signal is transmitted to the first bus on the basis of a result of the determination. The initialization control signal controls whether to prohibit the initialization of malfunction information. Accordingly, a control logic for determining whether to prohibit initialization of malfunction information does not have to be implemented in control units (slave units) other than the communication control unit (master unit) for the vehicle. Therefore, it is possible to suppress increase in manufacturing cost that depends on the number of control units installed in a vehicle, and it is possible to easily achieve uniform initialization control in comparison with existing methods.

In addition, according to the above-described examples, the initialization prohibition signal for comprehensively prohibiting initialization of malfunction information is transmitted to the first as the initialization control signal, in the case where initialization of malfunction information is determined to be comprehensively prohibited. Therefore, it is possible for the slave unit coupled to the first bus to recognize whether initialization of malfunction information is prohibited at this time simply by monitoring whether the initialization prohibition signal is received from the first bus as the initialization control signal.

In addition, according to the above-described examples, the initialization prohibition signal is a signal for prohibiting the slave unit that has received the initialization prohibition signal from initializing the malfunction information in accordance with an initialization request that is received from an external unit, regardless of states of other units. Therefore, even if a new control unit is installed in a vehicle, the slave unit that has already been installed does not have to take the state of the new control unit into consideration for the sake of initialization control unless the new control unit serves as the mater unit. In addition, it is only necessary for the new control unit to include the control logic for initialization control that is similar to the slave unit that has already been installed. As described above, according to the above-described examples, it is possible to improve reusability of the control logic for initialization control, and it is possible to improve scalability of the system.

In addition, according to the above-described examples, the initialization permission signal for permitting initialization of malfunction information is transmitted to the first bus in the case where initialization of malfunction information is determined not to be prohibited. Therefore, it is possible for the slave unit to immediately recognize whether initialization of malfunction information is permitted or comprehensively prohibited at this time by monitoring the first bus and detecting the initialization control signal serving as the initialization prohibition signal or the initialization permission signal. In a practical example, the initialization prohibition signal and the initialization permission signal may respectively correspond to a first bit value and a second bit value of a predetermined bit in a control frame that is periodically transmitted from the master unit. In this case, it is only necessary for the slave unit to monitor the predetermined bit for the sake of initialization control. This means that it is extremely easy to implement the initialization control function in the slave unit.

According to a practical example, the states of the vehicle include an operation state of the fail-safe function of at least one of units constituting the vehicle. The initialization prohibition condition may be a condition based on whether the fail-safe function is in the ON state or in the OFF state. This enables to prevent malfunction such as a runaway state of the vehicle from occurring due to initialization of malfunction information at a wrong timing at which safety is not ensured (or due to an attack by a malicious third party).

For instance, the states of the vehicle include an operation state of the engine and an operation state of the fail-safe function of the throttle. The initialization of malfunction information may be comprehensively prohibited in the case where the engine is in the ON state and the fail-safe function of the throttle is also in the ON state. In this case, it is possible to appropriately protect the fail-safe function of the throttle, and it is possible to perfect the safety of the vehicle. In addition, in the case where the engine control unit for controlling the engine is the master unit, additional communication cost is not necessary for collecting information (such as the operation state of the engine) required for determining whether the initialization prohibition condition is satisfied. This enables reduction in whole communication traffic in comparison with the existing methods in which a large number of controllers exchange signaling for the sake of initialization control. Therefore, it is also possible to lower the possibility of lack of bus capacity.

In this specification, the instance in which the technology according to the present disclosure is applied to hybrid vehicles has been mainly described. However, the present disclosure is not limited thereto. It is also possible to apply the technology according to the present disclosure to non-hybrid vehicles (such as a gas-powered vehicle, a diesel-powered vehicle, or an electric car).

Note that, the processes conducted by the functions described herein may be realized by any one of software, hardware, and a combination of software and hardware. Programs constituting the software are stored in advance, for instance, in non-transitory computer-readable storage media provided inside or outside of the respective control units. In addition, each program is read out, for instance, by random access memory (RAM) when each program is executed, and executed by a processor such as a central processing unit (CPU).

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A communication control system for a vehicle, the communication control system comprising:
   a bus mounted on the vehicle;
   one or more control units coupled to the bus, the one or more control units respectively storing pieces of malfunction information, the respectively stored pieces of malfunction information being initialized in response to an initialization request that is received from an external unit coupled to the bus; and
   a communication control unit coupled to the one or more control units via the bus,
   wherein the communication control unit comprehensively determines, based on a state of the vehicle, whether to prohibit initialization of the respectively stored pieces of malfunction information in the control units, and
   wherein in response to determining to prohibit the initialization of the respectively stored pieces of malfunction information, the communication control unit transmits, via the bus, an initialization prohibition signal to the one or more control units, and
   wherein when the one or more control units receive the initialization request from the external unit and when the one or more control units receive the initialization prohibition signal from the communication control unit, the one or more control units prohibit initialization of the respectively stored pieces of malfunction information.

2. The communication control system for a vehicle according to claim 1, wherein,
   in response to receiving the initialization prohibition signal from the communication control unit, the one or more control units set status of the one or more control units to initialization prohibition status, and
   when the initialization request from an external unit is received, the one or more control units prohibit initializing the respectively stored pieces of malfunction information based on the initialization prohibition status of the one or more control units.

3. The communication control system for a vehicle according to claim 2, wherein, in response to determining not to prohibit the initialization of the respectively stored pieces of malfunction information, the communication control unit transmits an initialization permission signal to the one or more control units, wherein in response to receiving the initialization permission signal from the communication control unit, the one or more control units set the status of the one or more control units to initialization permission status, and wherein when the initialization request from the external unit is received, the one or more control units initializes the respectively stored pieces of malfunction information based on the initialization permission status of the one or more control units.

4. The communication control system for a vehicle according to claim 3, wherein the initialization prohibition signal and the initialization permission signal respectively correspond to a first bit value and a second bit value of a predetermined bit in a control frame that is periodically transmitted from the communication control unit for the vehicle.

5. The communication control system for a vehicle according to claim 1, wherein the state of the vehicle comprises an operation state of a fail-safe function of at least one of units constituting the vehicle, and the communication control unit comprehensively determines whether to prohibit the initialization of the malfunction information on the basis of whether the fail-safe function is in an ON state or in an OFF state.

6. The communication control system for a vehicle according to claim 2, wherein the state of the vehicle comprises an operation state of a fail-safe function of at least one of units constituting the vehicle, and the communication control unit comprehensively determines whether to prohibit the initialization of the malfunction information on the basis of whether the fail-safe function is in an ON state or in an OFF state.

7. The communication control system for a vehicle according to claim 5, wherein the state of the vehicle comprises an operation state of an engine and an operation state of the fail-safe function of a throttle, and the communication control unit determines to prohibit the initialization of the malfunction information when the engine is in an ON state and the fail-safe function is also in an ON state.

8. The communication control system for a vehicle according to claim 6, wherein
the state of the vehicle comprises an operation state of an engine and an operation state of the fail-safe function of a throttle, and
the communication control unit determines to prohibit the initialization of the malfunction information when the engine is in an ON state and the fail-safe function is also in an ON state.

9. The communication control system for a vehicle according to claim 7, wherein the communication control unit for the vehicle is an engine control unit configured to control the engine.

10. The communication control system for a vehicle according to claim 8, wherein the communication control unit for the vehicle is an engine control unit configured to control the engine.

11. A communication control system for a vehicle, the communication control system comprising:
a first bus mounted on the vehicle;
one or more first control units coupled to the first bus, the one or more first control unit respectively storing pieces of malfunction information, the respectively stored pieces of malfunction information being initialized in response to an initialization request that is received from an external unit coupled to the first bus; and
a first communication control unit coupled to the one or more first control units via the first bus, wherein
the first communication control unit 1) comprehensively determines, based on a state of the vehicle, whether to prohibit the initialization of the respectively stored pieces of malfunction information and 2) transmits, to the one or more first control units via the first bus, an initialization prohibition signal in response to determining to prohibit the initialization of the respectively stored pieces of malfunction information, and
when the one or more first control units receive the initialization request from the external unit and when the one or more control units receive the initialization prohibition signal from the first communication control unit, the one or more first control units prohibit initialization of the respectively stored pieces of malfunction information.

12. The communication control system for a vehicle according to claim 11, wherein
the first communication control unit transmits, to the one or more first control units via the first bus, an initialization permission signal in response to determining not to prohibit the initialization of the respectively stored pieces of malfunction information,
the one or more first control units set status of the one or more first control units to 1) an initialization permission status in response to receiving the initialization permission signal from the communication control unit and 2) an initialization prohibition status in response to receiving the initialization prohibition signal from the communication control unit,
when the one or more first control units receive the initialization request from an external unit and when the status of the one or more first control units are set to the initialization permission status, the one or more first control units initialize the respectively stored pieces of malfunction information, and
when the one or more first control units receive the initialization request from the external unit and when the status of the one or more first control units are set to the initialization prohibition status, the one or more first control units prohibits initializing the respectively stored pieces of malfunction information.

13. The communication control system for a vehicle according to claim 11, further comprising a second communication control unit that receives the initialization permission signal or the initialization prohibition signal from the first communication control unit via the first bus,
wherein in response to receiving the initialization permission signal or the initialization prohibition signal, the second communication control unit relays the received initialization permission signal or the initialization prohibition signal to one or more second control units via a second bus that is different from the first bus.

14. The communication control system for a vehicle according to claim 12, further comprising a second communication control unit that receives the initialization permission signal or the initialization prohibition signal from the first communication control unit via the first bus,
wherein in response to receiving the initialization permission signal or the initialization prohibition signal, the second communication control unit relays the received initialization permission signal or the initialization prohibition signal to one or more second control units via a second bus that is different from the first bus.

15. The communication control system for a vehicle according to claim 13, wherein the initialization request transmitted from an external unit arrives at the second bus via the first bus.

16. The communication control system for a vehicle according to claim 14, wherein the initialization request transmitted from the external unit arrives at the second bus via the first bus.

17. A communication control unit for a vehicle, comprising:
   circuitry configured to:
      determine, based on a state of the vehicle, whether to prohibit initialization of pieces of malfunction information respectively stored in one or more control units, the one or more control units coupled to 1) a bus mounted on the vehicle and 2) the communication control unit via the bus, the respectively stored pieces of malfunction information being initialized in response to an initialization request that is received from an external unit coupled to the bus; and
      in response to determining to prohibit the initialization of the respectively stored pieces of malfunction information, 1) transmit, via the bus, an initialization prohibition signal to the one or more control units and 2) allow the one or more control units to set status of the one or more control units to initialization prohibition status,
   wherein when the one or more control units receive the initialization request from the external unit and when the status of the one or more control units are set to the initialization prohibition status, the one or more control units prohibit initializing the respectively stored pieces of malfunction information.

18. The communication control unit for a vehicle according to claim 17,
   wherein in response to determining not to prohibit the initialization of the respectively stored pieces of malfunction information, the circuitry 1) transmit, via the bus, an initialization permission signal to the one or more control units and 2) allow the one or more control units to set status of the one or more control units to initialization permission status, and
   wherein when the one or more control units receive the initialization request from an external unit and when the status of the one or more control units are set to the initialization permission status, the one or more control units initialize the respectively stored pieces of malfunction information.

* * * * *